INVENTOR.
Arthur H. Youmans

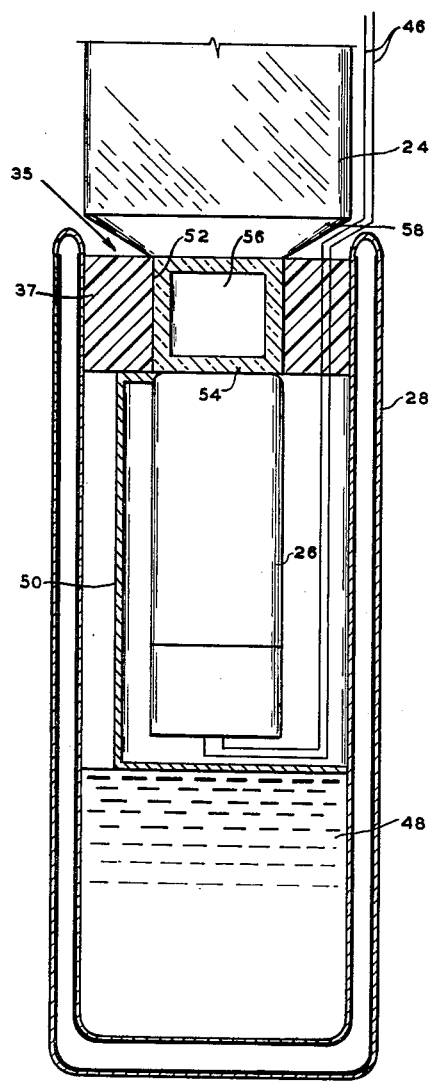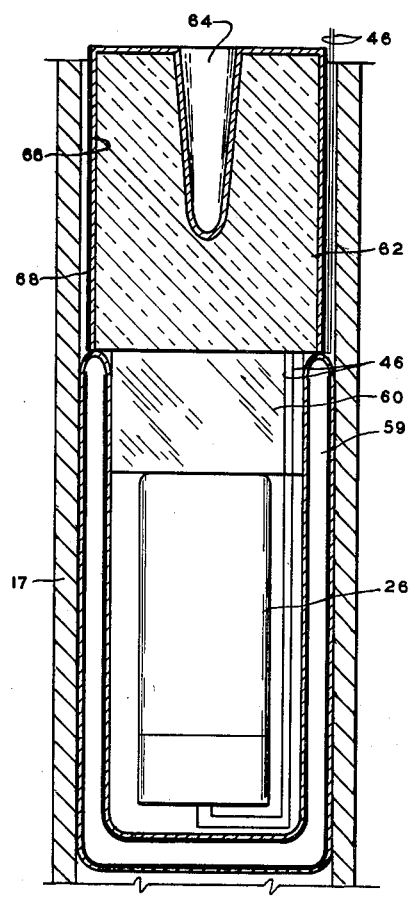

United States Patent Office 2,949,534
Patented Aug. 16, 1960

2,949,534

HIGH TEMPERATURE SCINTILLATION DETECTOR

Arthur H. Youmans, Tulsa, Okla., assignor to Well Surveys, Incorporated, a corporation of Delaware Filed Apr. 15, 1957, Ser. No. 652,744

11 Claims. (Cl. 250—71.5)

This invention relates to radioactivity well logging and particularly to novel means for mounting scintillation detectors for use in radioactivity well logging.

In the art of radioactivity well logging, a detecting instrument is suspended in a borehole on the end of a cable, and is made to traverse the borehole to detect radioactivity in the formations surrounding the borehole. Signals from the detecting instrument are transmitted through the cable to the surface of the earth where they are recorded on a chart to make a "log." Within the detecting instrument are a radioactivity detector and a number of associated electronic elements. When scintillation type detectors are employed, it is necessary to provide a photomultiplier tube to translate the scintillations into electrical signals.

Unfortunately, photomultipliers cannot withstand high temperatures, whereas the temperatures encountered in boreholes may be as high as 300–400° F. Accordingly, it has been general practice heretofore to mount the scintillation phosphor and the photomultiplier tube in a thermally insulated container, such as a Dewar flask, to protect them against damage by the high temperatures. On the other hand, the sensitivity of scintillation phosphors is proportional to the volume of the phosphor. In well logging instruments, the diameter of the phosphor is limited by the diameter of the instrument and this, obviously, must be smaller than the diameter of the borehole. If the phosphor and photomultiplier tube are to be placed within an insulated container, the diameter of the phosphor must be reduced still further. Moreover, if the length of the phosphor is increased to compensate for this, the resolution of the instrument suffers. As a result, it has not been considered possible to insulate scintillation instruments less than about 2 inches in diameter. Consequently, these instruments heretofore, have been used only for wells having temperatures less than 150° F.

These disadvantages of prior art devices are overcome with the present invention, and a scintillation instrument is provided which is capable of greatly increased sensitivity without loss of resolution even in high temperature operation.

The advantages of the present invention are preferably attained by providing a novel scintillation instrument wherein the photomultiplier tube is mounted inside of a thermally insulated container while the scintillation phosphor is mounted outside of the container, and means are provided for conducting light from the scintillation phosphor through the container wall to the photomultiplier tube.

Accordingly, it is an object of the present invention to provide a novel scintillation type instrument for radioactivity well logging having greatly increased sensitivity without loss of resolution.

Another object of the present invention is to provide a novel scintillation type instrument for radioactivity well logging which is capable of use in high temperature operation.

A further object of the present invention is to provide a novel scintillation type instrument for radioactivity well logging wherein the volume of the scintillation phosphor may be greatly increased.

A specific object of the present invention is to provide a novel scintillation type instrument for radioactivity well logging having the photomultiplier tube mounted in a thermally insulated container while the scintillation phosphor is mounted outside the insulated container and means are provided for conducting light from the phosphor through the wall of the container to the photomultiplier tube.

These and other objects and features of the present invention will be apparent from the following description wherein reference is made to the figures of the accompanying drawing.

In the drawing:

Fig. 3 is a partial sectional view of a further modified form of the device of Fig. 1; and Fig. 4 is a partial sectional view of an additional modified form of the invention.

Figures 1, 2:
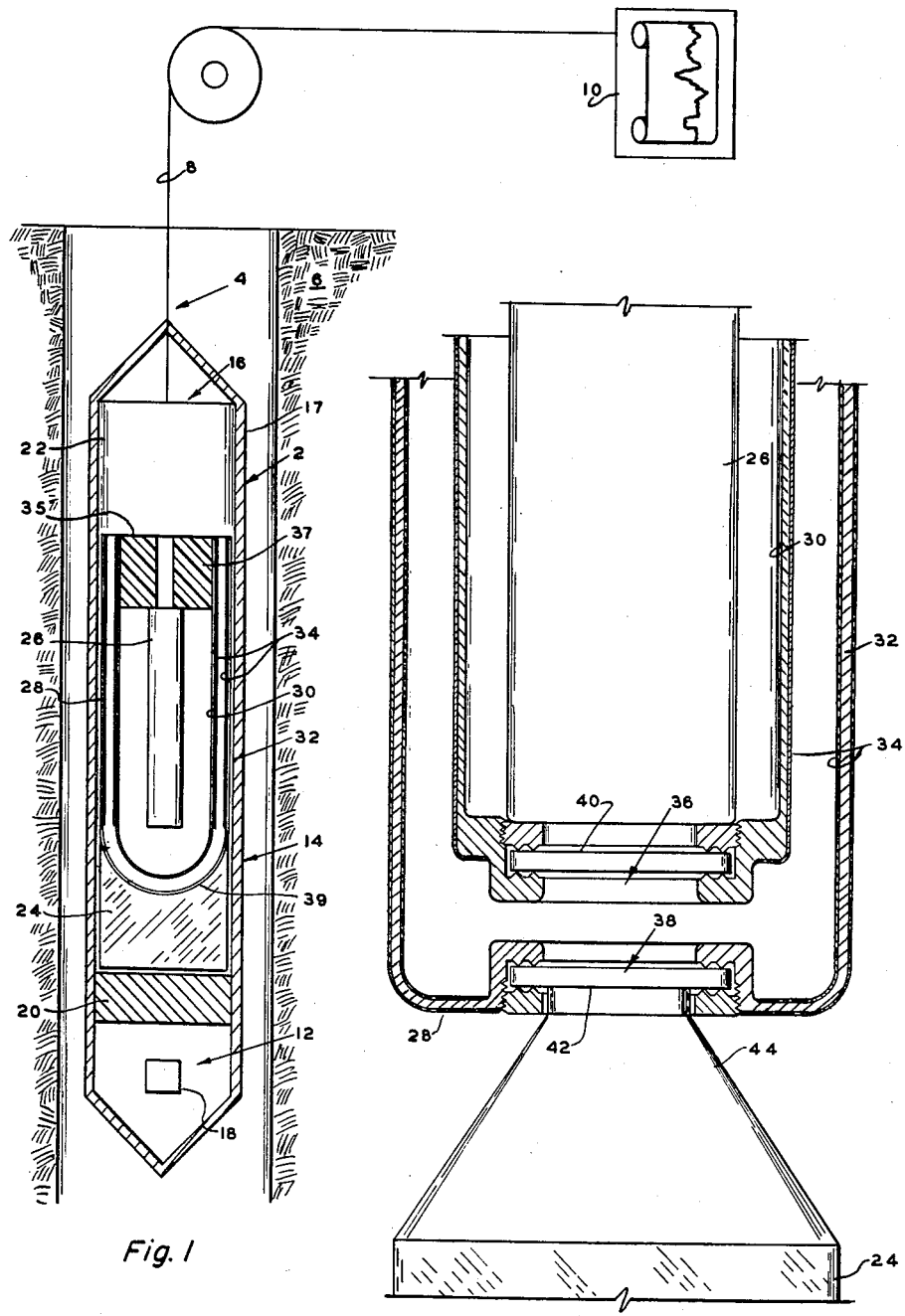
Fig. 1 is a diagrammatic illustration of a typical radioactivity well logging instrument embodying the present invention suspended in a borehole.
Fig. 2 is a partial sectional view of a modified form of the device of Fig. 1.

In those forms of the invention chosen for purposes of illustration in the drawings, Fig. 1 shows a subsurface instrument 2 suspended in a borehole 4 which penetrates the earth 6. The instrument 2 is suspended in the borehole 4 by means of a cable 8 which comprises at least one electrical conductor and serves to transmit signals from the instrument 2 to a recording device 10 at the surface of the earth.

The instrument 2 may be divided functionally into three portions; a source portion 12, a detector portion 14 and a signal processing portion 16 all of which are mounted inside of a protective housing 17. The source portion 12 comprises a source 18 of gamma rays or neutrons and suitable shielding 20 to prevent radiations emitted by the source 18 from passing directly to the detector portion 14 of the instrument without penetrating the formations surrounding the borehole. The source 18 may be either a natural or an artificial source of radioactivity and is employed for making neutron or induced gamma ray logs. For measurement of the natural radioactivity of the formations, the source portion 12 may be removed. The signal processing portion 16 includes suitable electronic apparatus 22, such as power supplies, amplifiers and discriminators, for processing the signals from the detector portion 14 and impressing the processed signals onto the cable 8 for transmission to the surface.

The detector portion 14 of the instrument 2 houses a radioactivity detector. In scintillation type instruments this detector comprises a scintillation phosphor 24, formed of a liquid, solid or gaseous material which emits light pulses upon irradiation of the phosphor by radioactivity, and a photosensitive device 26, such as a photomultiplier tube, for translating the light pulses emitted by the phosphor 24 into corresponding electrical signals. These signals are passed to the signal processing portion 16 of the instrument for processing and transmission to the surface.

Photomultiplier tubes which are at the present time commercially available cannot withstand high temperatures. At temperatures above 150° F. these devices become completely unreliable and are likely to be made permanently inoperative. On the other hand, temperatures in excess of 350° F. may be encountered during logging operations. Accordingly, it has been the practice, heretofore, to surround the scintillation phosphor and photomultiplier tube with thermal insulation or to mount them in a refrigerated container, such as a vacuum flask. However, this greatly decreases the useful space within the detector portion 14 of the instrument. In fact, from one-third to one-half of the diameter of the detector portion is generally required for the insulating member. Consequently, the diameter of the phosphor and, hence, the sensitivity of the instrument are considerably restricted.

Although the photomultiplier tubes cannot withstand high temperatures, applicant has found that scintillation phosphors, such as sodium iodide or lithium iodide, are relatively insensitive to temperature. For example, applicant has found that the light output from sodium iodide varies only about 1% for a change of 15° F. This would mean a change in light output of approximately only 20% in a temperature range from 50 to 350° F. Furthermore, this change in light output may be still further reduced by the addition to the phosphor of the optimum concentration of an activator, such as thallium. Additionally, phosphors which emit ultraviolet light are especially insensitive to temperature. Such materials as barium fluoride, calcium fluoride, argon, xenon, and He are suitable ultraviolet phosphors. On the other hand, by eliminating a major portion of the insulation about the phosphor, applicant can increase the diameter of the phosphor by 60 to 100% with a corresponding increase in sensitivity. Thus, it will be seen that the increase in sensitivity obtained by removing the insulation from the phosphor is significantly greater than the loss due to exposure of the phosphor to thermal change. However, exposing the scintillation counter to higher temperatures would damage the photomultiplier.

To overcome this dilemma, applicant proposes to mount the photo-multiplier tube inside a thermally insulated container with the scintillation phosphor mounted outside of the container and to provide means in the wall of the container to pass light from the phosphor to the photomultiplier tube. Thus, as seen in Fig. 1, the photomultiplier tube 26 is mounted inside of a thermally insulated container comprising, in this case, a vacuum flask 28 having spaced inner and outer walls, 30 and 32 respectively, formed of transparent material having a low thermal conductivity. The space between the walls 30 and 32 is evacuated and the facing surfaces of these walls are preferably provided with a thermally reflective coating 34. In addition, the open end 35 of the flask 28 is filled with a suitable thermally insulating material 37 and is sealed to prevent heat from entering the flask through end 35. Moreover, the flask 28 may be refrigerated, if desired, as taught in the patent of R. A. Bergan, Patent No. 2,711,084. The scintillation phosphor 24 is mounted outside of and, preferably, in contact with the closed end 39 of the flask 28 and the coating 34 is omitted from this portion of the flask or is made so thin that the walls 30 and 32 are only "half-silvered" in this area.

With this arrangement, the photomultiplier tube 26 is protected against high temperatures by the vacuum flask 28 while the diameter of the scintillation phosphor 24 may be made as large as the outside diameter of the vacuum flask 28 and the volume and sensitivity of the phosphor 24 will, thus, be materially increased. When radiation strikes the phosphor 24, scintillations or light pulses will be emitted which can pass through the uncoated portions of the transparent walls 30 and 32 of the vacuum flask 28. These scintillations can then reach the photomultiplier tube 26 where they will be translated into corresponding electrical pulses which will be passed to the signal processing portion 16 of the instrument for transmission up the cable 8 to the recording device 10.

In many instances, it is necessary or desirable to form the vacuum flask 28 of metal or other non-transparent material. When this is true, the modified form of the invention illustrated in Fig. 2 may be employed to provide for passage of light pulses from the phosphor 24 to the photomultiplier tube 26. As seen in Fig. 2, aligned openings 36 and 38 are formed in the walls 30 and 32 respectively of the vacuum flask 28 and windows 40 and 42 formed of transparent material of low thermal conductivity may be mounted in sealing relation in the openings 36 and 38 respectively. It has been found that sapphire is particularly well suited for forming the windows 40 and 42, as is more fully described in the copending application of George E. Sykora, Serial No. 638,560, filed February 6, 1957, now abandoned. The method of mounting such windows is also disclosed in that application.

With the windows 40 and 42 mounted in the walls 30 and 32 of the vacuum flask 28, a light path has been provided by means of which light pulses from the phosphor 24 mounted outside the flask 28 may pass to the photomultiplier tube 26 which is mounted inside the flask 28. Preferably, a light pipe 44 formed of any suitable material will be provided to conduct light pulses from the peripheral regions of the phosphor 24 to the windows 40 and 42 for passage to the photomultiplier tube 26. The light pipe 44 may be formed of the same material as the phosphor 24 and, if desired, the light pipe 44 and phosphor 24 may be formed integral to reduce light losses due to reflection at the various surfaces.

In some instances, it may be preferable or desirable to mount the scintillation phosphor 24 adjacent the open end 35 of the flask 28. To accomplish this, the modification of the present invention illustrated in Fig. 3 may be employed. In this form of the invention, the photomultiplier tube 26 is mounted inside of the flask 28 with the photocathode facing toward the open end 35. Thermally insulating material 37, such as felt or Fiberglas, seals the open end 35 of the flask 28 to prevent heat from entering the flask 28 through the open end 35. Wires 46 for connecting the photomultiplier tube 26 to the electronic apparatus of the instrument may be passed through the insulating material 37 in any conventional manner which provides a minimum of thermal conductivity. Preferably, ice or other suitable thermal capacitance 48 is provided in the flask 28 to maintain a desirable temperature within the flask 28 and a good thermal conductor 50 may be provided to conduct heat away from the photocathode of the photomultiplier toward the thermal capacitance 48.

To permit light from the scintillation phosphor 24 to reach the photomultiplier 26, an opening 52 is formed in the insulating material 37 and a window 54 composed of transparent material of low thermal conductivity may be mounted in the opening 52. If desired, the window 54 may be formed hollow, as shown, in which case the space 56 within the window 54 may be evacuated. A light pipe 58, formed of any suitable material may be employed to carry light pulses from the peripheral regions of the phosphor 24 to the window 54 which passes the light pulses to the photomultiplier tube 26 inside the flask 28.

If desired, insulating material 37 may be omitted and the window 54 may be formed to fill the open end 35 of the flask 28, in which case the window 54 will be secured to the walls of flask 28 in sealing relation. Moreover, as described above with respect to Fig. 2, the light pipe 58 and phosphor 24 may be formed of the same material and may, if desired, be formed integral to reduce light losses due to reflection at the various surfaces. In the alternative, the light pipe 58 may be formed of the same material as the window 54 and these two elements may, if desired, be formed integrally. As a further alternative, the window 54, light pipe 58 and phosphor 24 may be all formed of the same material and, if desired, these three elements may all be formed as a single unit.

While the light output of crystal scintillation phosphors is not materially affected by temperature, if the temperature changes suddenly, the crystal may undergo thermal shock and become fractured. The possibility of thermal shock may be minimized, however, by employing the apparatus of Fig. 4. In this form of the invention, the photomultiplier tube 26 is mounted in a vacuum flask 59, and a transparent insulating window 60 is mounted in sealing relation with the walls of the flask 59. The scintillation crystal 62 is mounted outside of the flask 59 in such a position that light emitted by the crystal 62 may pass through the window 60 to the photomultiplier tube 26. To prevent thermal shock, an axial recess 64 of relatively small diameter is formed in the crystal 62 extending generally centrally thereof. With this arrangement, heat will be conducted through the crystal 62 in both radial directions. Thus, the thermal gradients will be reduced and the likelihood of thermal shock will be minimized.

To reduce thermal gradients by maintaining all surfaces of the crystal at substantially the same temperature, the crystal 62 may be mounted in a can 66 of thermally conductive material. The can 66 also extends about the peripheral surfaces of the crystal 62 and into contact with the flask 59. Obviously, if the can 66 is opaque, it cannot extend between the crystal 62 and window 60.

To reduce the possibility of sudden temperature changes at the surface of the can 66, a thin layer 68 of thermally insulating material may be introduced between the can 66 and the housing 17. Alternatively, the crystal 62 may be divided longitudinally into a plurality of crystals of smaller cross section. These small diameter crystals will preferably be formed with all surfaces polished, and all those except the extreme ends formed parallel to the axis of the crystal. This permits differential expansion of the smaller crystals individually and reduces the possibility of fracture due to thermal shock.

As a further alternative, gas or liquid scintillation phosphors may be employed. Either of these is preferable to crystal phosphors as the gas and liquid phosphors, obviously, cannot fracture. In this connection, it has been found that He$^3$ is a very satisfactory phosphor for neutron detection while xenon under high pressure is a good phosphor for gamma ray detection.

Numerous other variations and modifications may also be made without departing from the invention. Accordingly, it should be clearly understood that those forms of the invention described above and shown in the figures of the accompanying drawings are illustrative only and are not intended to limit the scope of the invention.

What I claim is:

1. A subsurface instrument for radioactivity well logging comprising a thermally insulating container, a photosensitive device for translating light pulses into corresponding electrical signals, said photosensitive device being mounted inside of said container for protection against high temperatures, a scintillation phosphor capable of emitting light pulses in response to irradiation by radioactive emanations, said scintillation phosphor being mounted outside of said container, and means for passing light pulses emitted by said phosphor into said container to said photosensitive device.

2. A subsurface instrument for radioactivity well logging comprising a vacuum flask having a pair of spaced walls, the space between said walls being evacuated, a photosensitive device for translating light pulses into corresponding electrical signals, said photosensitive device being mounted inside of said vacuum flask for protection against high temperature, a scintillation phosphor mounted outside of said vacuum flask and being capable of emitting light pulses in response to irradiation by radioactive emanations, and means for passing light pulses emitted by said scintillation phosphor into said vacuum flask to said photosensitive device.

3. A subsurface instrument for radioactivity well logging comprising a Dewar flask having a pair of spaced walls, the space between said walls being evacuated, said flask being formed of transparent material of low thermal conductivity, a photomultiplier tube mounted in said flask and capable of translating light pulses into corresponding electrical signals, a scintillation phosphor mounted outside said flask and capable of emitting light pulses in response to irradiation by radioactive emanations, and a coating of thermally reflective material covering substantially all of the facing surfaces of the walls of said flask, the portions of said surfaces located between said scintillation phosphor and said photomultiplier tube being uncoated to permit light pulses emitted by said scintillation phosphor to pass through said walls to said photomultiplier tube.

4. A subsurface instrument for radioactivity well logging comprising a thermally insulating container having a wall, a photomultiplier tube mounted in said container and capable of translating light pulses into corresponding electrical signals, an opening formed in said wall in alignment with said photomultiplier tube, a transparent window mounted in said opening to permit passage of light from outside of said container to said photomultiplier tube, and a scintillation phosphor mounted outside of said container and capable of emitting light pulses in response to irradiation by radioactive emanations.

5. A subsurface instrument for radioactivity well logging comprising a vacuum flask having inner and outer spaced walls, the space between said walls being evacuated, a photomultiplier tube mounted in said flask and capable of translating light pulses into corresponding electrical signals, openings formed in each of said walls in alignment with each other and with said photomultiplier tube, transparent windows sealed in said openings to permit passage of light from outside of said flask to said photomultiplier tube, a scintillation phosphor mounted outside of said flask and capable of emitting light pulses in response to irradiation by radioactive emanations, and a light pipe for conveying light from said phosphor to said windows.

6. A subsurface instrument for radioactivity well logging comprising a thermally insulating container, a photomultiplier tube mounted in said chamber and capable of translating light pulses into corresponding electrical signals, insulating means disposed about said photomultiplier tube within said container, an opening formed in said insulating means in alignment with said photomultiplier tube, an insulating window formed of transparent material mounted in said opening, a scintillation phosphor mounted outside of said container and capable of emitting light pulses in response to irradiation by radioactive emanations, and a light pipe for conveying light from said phosphor to said window for passage therethrough to said photomultiplier tube.

7. A subsurface instrument for radioactivity well logging comprising a photosensitive device capable of translating light pulses into corresponding electrical signals, thermal insulation surrounding said photosensitive device, a scintillation phosphor mounted outside of said insulation and capable of emitting light pulses in response to irradiation by radioactive emanations, and means for passing light pulses emitted by said phosphor through said insulation to said photosensitive device.

8. A subsurface instrument for radioactivity well logging comprising a thermally insulated container, a photosensitive device for translating light pulses into corresponding electrical signals, said photosensitive device being mounted inside of said container for protection against high temperatures, a scintillation phosphor capable of emitting light pulses in response to irradiation by radioactive emanations, said scintillation phosphor being formed with an axial recess extending generally centrally thereof and being mounted outside of said container, and means for passing light pulses emitted by said phosphor into said container to said photosensitive device.

9. A subsurface instrument for radioactivity well logging comprising a refrigerated container, a photosensitive device for translating light pulses into corresponding electrical signals, said photosensitive device being mounted inside of said container for protection against high temperatures, a scintillation phosphor capable of emitting light pulses in response to irradiation by radioactive emanations, said scintillation phosphor being formed with an axial recess extending generally centrally thereof and being mounted outside of said container, a can of thermally conductive material extending about the peripheral surfaces of said phosphor into contact with the walls of said container, said can having a portion thereof lining said recess, and means for passing light pulses emitted by said phosphor into said container to said photosensitive device.

10. A subsurface instrument for radioactivity well logging comprising a thermally insulating container, a photosensitive device for translating light pulses into corresponding electrical signals, said photosensitive device being mounted inside of said container for protection against high temperature, a volume of $He^3$ gas located outside of said container, and means optically coupling said photosensitive device with said gas.

11. A subsurface instrument for radioactivity well logging comprising a thermally insulating container, a photosensitive device for translating light pulses into corresponding electrical signals, said photosensitive device being mounted inside of said container for protection against high temperature, a volume of xenon gas under high pressure located outside of said container, and means optically coupling said photosensitive device with said gas.

References Cited in the file of this patent

UNITED STATES PATENTS

| | | |
|---|---|---|
| 2,517,404 | Morton | Aug. 1, 1950 |
| 2,686,268 | Martin et al. | Aug. 10, 1954 |
| 2,711,482 | Goodman | June 21, 1955 |
| 2,727,119 | Thomson | Dec. 13, 1955 |
| 2,749,446 | Herzog | June 5, 1956 |
| 2,759,107 | Armistead et al. | Aug. 14, 1956 |